US011958296B2

(12) United States Patent
Komplin

(10) Patent No.: US 11,958,296 B2
(45) Date of Patent: Apr. 16, 2024

(54) FLUID INTERCONNECTION FOR BULK INK SUPPLY

(71) Applicant: FUNAI ELECTRIC CO., LTD., Osaka (JP)

(72) Inventor: Steven R. Komplin, Lexington, KY (US)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 18/308,989

(22) Filed: Apr. 28, 2023

(65) Prior Publication Data

US 2023/0256747 A1 Aug. 17, 2023

Related U.S. Application Data

(63) Continuation of application No. 17/734,500, filed on May 2, 2022, now Pat. No. 11,673,397, which is a continuation of application No. 17/096,155, filed on Nov. 12, 2020, now Pat. No. 11,383,522, which is a continuation of application No. 16/423,659, filed on May 28, 2019, now Pat. No. 10,864,740, which is a continuation of application No. 15/478,887, filed on Apr. 4, 2017, now Pat. No. 10,350,898, which is a continuation of application No. 14/485,262, filed on Sep. 12, 2014, now Pat. No. 9,623,667.

(51) Int. Cl.
*B41J 2/175* (2006.01)

(52) U.S. Cl.
CPC ........... *B41J 2/17523* (2013.01); *B41J 2/175* (2013.01); *B41J 2/17509* (2013.01); *B41J 2/17513* (2013.01); *B41J 2/17553* (2013.01); *B41J 2/17556* (2013.01); *B41J 2/17506* (2013.01)

(58) Field of Classification Search
None
See application file for complete search history.

(56) References Cited

U.S. PATENT DOCUMENTS 5,745,137 A 4/1998 Scheffelin et al.
5,751,319 A 5/1998 Robertson et al.
5,886,719 A 3/1999 Zepeda
5,980,032 A 11/1999 Pawlowski, Jr. et al.
6,076,920 A 6/2000 Zapata et al.
(Continued)

FOREIGN PATENT DOCUMENTS

CN 201659748 U 12/2010
JP 2000079705 A 3/2000
(Continued)

OTHER PUBLICATIONS

The State Intellectual Property Office of the People's Republic of China, "The First Office Action," issued in CN Patent Application No. 2015800488056, which is a Chinese counterpart of U.S. Appl. No. 15/478,887, filed Jan. 19, 2018, 17 pages (10 pages of English Translation and 7 page of Office Action).

*Primary Examiner* — Justin Seo
(74) *Attorney, Agent, or Firm* — Amster, Rothstein & Ebenstein LLP

(57) ABSTRACT

A fluid interconnect system including a mating component having an inlet port and a liquid outlet, the inlet port configured to support an interconnector and the liquid outlet configured to engage with a print cartridge so that liquid flows from a liquid source, through the interconnector and the inlet port, and out of the liquid outlet into the print cartridge.

12 Claims, 16 Drawing Sheets

(56) References Cited

U.S. PATENT DOCUMENTS

| | | | |
|---|---|---|---|
| 6,120,143 | A | 9/2000 | Narushima et al. |
| 6,199,977 | B1 | 3/2001 | Komplin et al. |
| 6,843,558 | B2 | 1/2005 | Seino |
| 8,371,682 | B1 | 2/2013 | Del Raso |
| 2002/0036680 | A1 | 3/2002 | Hall et al. |
| 2002/0149646 | A1 | 10/2002 | Pawlowski, Jr. et al. |
| 2007/0051421 | A1 | 3/2007 | Sarnoff et al. |

FOREIGN PATENT DOCUMENTS

| | | | |
|---|---|---|---|
| JP | 2007301780 | A | 11/2007 |
| JP | 2014046607 | A | 3/2014 |

FLUID INTERCONNECTION FOR BULK INK SUPPLY

CROSS-REFERENCE TO RELATED APPLICATION

The present application is a continuation of and claims the benefit of and priority to co-pending U.S. patent application Ser. No. 17/734,500, filed May 2, 2022, which is a continuation of and claims the benefit of and priority to co-pending U.S. patent application Ser. No. 17/096,155, filed Nov. 12, 2020 and issued as U.S. Pat. No. 11,383,522, which is a continuation of and claims the benefit of and priority to U.S. patent application Ser. No. 16/423,659, filed May 28, 2019 and issued as U.S. Pat. No. 10,864,740 on Dec. 15, 2020, which is a continuation of and claims the benefit of and priority to U.S. patent application Ser. No. 15/478,887, filed Apr. 4, 2017 and issued as U.S. Pat. No. 10,350,898 on Jul. 16, 2019, which is a continuation of and claims the benefit of and priority to U.S. patent application Ser. No. 14/485,262, filed Sep. 12, 2014 and issued as U.S. Pat. No. 9,623,667 on Apr. 18, 2017, which are incorporated herein by reference in their entirety as if fully set forth herein.

FIELD OF THE INVENTION

The present invention generally relates to inkjet printers, and more particularly, to a fluid interconnecting mating feature between a print cartridge and an external fluid supply.

BACKGROUND OF THE INVENTION

Conventional ink jet printers include a printhead and a carrier. The ink jet printhead may comprise a printhead body, nozzles, and corresponding ink ejection actuators. The actuators cause ink to be ejected from the nozzles onto a print medium at selected ink dot locations within an image area. The carrier moves the printhead relative to the medium, while the ink dots are jetted onto selected pixel locations.

A common type of inkjet printer uses a replaceable print cartridge which may contain a printhead and a supply of ink contained within the print cartridge. The print cartridge is not intended to be refillable and when the initial supply of ink is depleted, the print cartridge is discarded and a new print cartridge is installed within the scanning carriage. The tanks on these types of print cartridges will typically have small liquid volumes, as low as 10 mL in some cases, which may require frequent replacement.

More expensive, business grade printers use progressively larger ink tanks on the printhead, but as the print swath width and/or height, and/or the speed at which the printhead moves increases, it eventually becomes impractical to have the tanks integrated with the printheads due to the high mass and inertia the liquid volume adds to the printheads, which results in reduced printing accuracy. Further, with ink tanks located on the printhead, replacement typically requires repriming and alignment checks that necessarily require aborting any current job.

To overcome this problem, it is known to provide a stationary, external fluid supply connected to the print cartridge. Examples are described in U.S. Pat. Nos. 5,980,032, 5,751,319, 8,371,682, and 6,843,558, to name a few. Ink flows from the external fluid supply into the print cartridge through a fluidic connection, as needed. External fluid delivery systems can be refilled or reprimed without disrupting a very large or expensive printing task.

However, external fluid delivery systems have several drawbacks. Existing external fluid delivery systems are not customizable; printhead assemblies in these systems are typically sold with ink and are designed to be used only for that system. Thus, existing systems lack versatility for multiple purpose use. Other drawbacks of existing external fluid delivery systems include: undesirable fluctuations in ink pressure in the print cartridge, an unreliable and complex fluid seal between the print cartridge and the external ink supply, a difficult fluid connection alignment process from the print cartridge to the external ink supply, increased printer size due to the external ink supply's connection to the print cartridge, blockage in the ink delivery system, air accumulation in the tubes leading to the print cartridge, leakage of ink, high cost, and complexity.

A further disadvantage is that current external fluid delivery systems, specifically printhead assemblies, require complex assembly and manufacturing processes. These parts may have a large footprint on the assembly line, which typically requires additional tooling and cost to complete the manufacturing process.

SUMMARY OF THE INVENTION

An object of this invention is to provide a print cartridge with a fluid interconnecting mating feature that allows the print cartridge to connect to an external fluid delivery system with improved convenience and customization.

The print cartridge is designed to accept a guided mating component. The mating component is designed to connect to the print cartridge later in the assembly process for reduced manufacturing complexity and increased convenience and customization capabilities. A fluid interconnector connects at one end to the mating component and at the other end to the external fluid supply. Fluid such as ink is transferred from the external ink supply through the fluid interconnector and mating component and into the print cartridge.

The mating component is designed to be robust and interlock with parts on the print cartridge for easy alignment with the external fluid supply, a secure connection, and easy connect-disconnect options for the user. The mating component can be interchanged with other like-systems, which allows the printing system to remain versatile and fit the user's needs for different types of printing tasks. The mating component can be interchanged depending on the external fluid's viscosity, or if the user desires a different fluid flow, to name a few. Further, a removable mating component also allows the user to easily diagnose blockages, air accumulation, and leakages in the ink delivery system.

According to an exemplary embodiment of the present invention, a printhead assembly is disclosed, and comprises a cartridge body comprising a chamber, a bladder, a lid disposed over the chamber of the cartridge body, a liquid interconnect system, and a printhead chip. The bladder comprises a liquid fill hole and an exit port, and is disposed within the chamber of the cartridge body and adapted to receive and contain liquid. The printhead chip is disposed on the cartridge body and is in fluid communication with the bladder so as to receive liquid from the bladder for ejection of the liquid onto a print medium. The liquid interconnect system comprises a mating component that includes an inlet port and a liquid outlet. The inlet port is configured to support a liquid interconnector and the liquid outlet is configured to engage with the cartridge body so that the liquid outlet is aligned with the bladder liquid fill hole for transfer of liquid into the bladder.

In exemplary embodiments, the mating component has a groove configured to engage with the opening of the cartridge body.

In exemplary embodiments, the liquid interconnect system further comprises a needle aligned with the fill hole to dispel the liquid into the bladder, an external liquid connection configured to connect to an external liquid supply, and an interlock connected to the external liquid connection, the interlock configured to releasably connect with the mating component.

In exemplary embodiments, the interlock on the external liquid connection comprises a threaded nut that is rotatably engaged with the mating component for connection and disconnection with the mating component.

In exemplary embodiments, the bladder comprises a frame member comprising a cavity and a flexible sidewall and a spring member disposed between the frame member cavity and the flexible sidewall. The spring member is engaged with the frame member cavity and the sidewall to bias the flexible sidewall away from the frame member to cause a vacuum pressure to form within the bladder.

In exemplary embodiments, the printhead assembly further comprises a spring guard disposed between the flexible sidewall and the spring member to protect the flexible sidewall from spring punctures.

In exemplary embodiments, the bladder comprises a septum, a ball, and a ball spring within the liquid fill hole.

In exemplary embodiments, the liquid interconnect system is a tube configured for connection to a septum within the cartridge body.

In exemplary embodiments, the tube includes a valve for regulating the flow of liquid into the bladder.

In exemplary embodiments, the liquid interconnect system includes a connection tube extending at least partially through the mating component, the connection tube configured to connect with the tube.

In exemplary embodiments, the bladder fill hole and exit port are oriented at ninety degrees with respect to each another.

In exemplary embodiments, the mating component is integrally formed with the frame member of the bladder.

In exemplary embodiments, a fluid interconnect system comprises a mating component that includes an inlet port and a fluid outlet. The inlet port is configured to support a fluid interconnector and the fluid outlet is configured to engage with a cartridge body so that the fluid outlet is aligned with a bladder fluid fill hole for transfer of fluid into the bladder.

In exemplary embodiments, the mating component is configured to be disengaged from the cartridge body such that it can be interchanged with another mating component.

In exemplary embodiments, the inlet port protrudes outward from the cartridge body and is adapted for flush and concentric engagement with an external fluid interconnector, and the fluid outlet extends inwards into the cartridge body and is adapted to align concentrically with the fill hole for transfer of fluid into the fluid bladder.

In exemplary embodiments, the fluid interconnect is a tube configured for connection to a septum within the cartridge body.

In exemplary embodiments, the tube includes a valve to control the flow of fluid into the bladder.

In exemplary embodiments, the fluid interconnector system further comprises a connection tube extending at least partially through the mating component, the connection tube configured to connect with the tube.

In exemplary embodiments, the fluid interconnect comprises a needle aligned with the fluid fill hole to dispel the fluid into the bladder, and an external fluid connection configured to connect to an external fluid supply.

These and other features and advantages of this invention will become readily apparent from the following detailed description of various exemplary embodiments, the accompanying drawings, and the appended claims.

BRIEF DESCRIPTION OF THE DRAWINGS

The foregoing summary as well as the following detailed description of the exemplary embodiments of the present invention will best be understood when considered in conjunction with the accompanying drawings, wherein like designations denote like elements throughout the drawings and wherein.

DETAILED DESCRIPTION OF THE INVENTION

Figure 1:
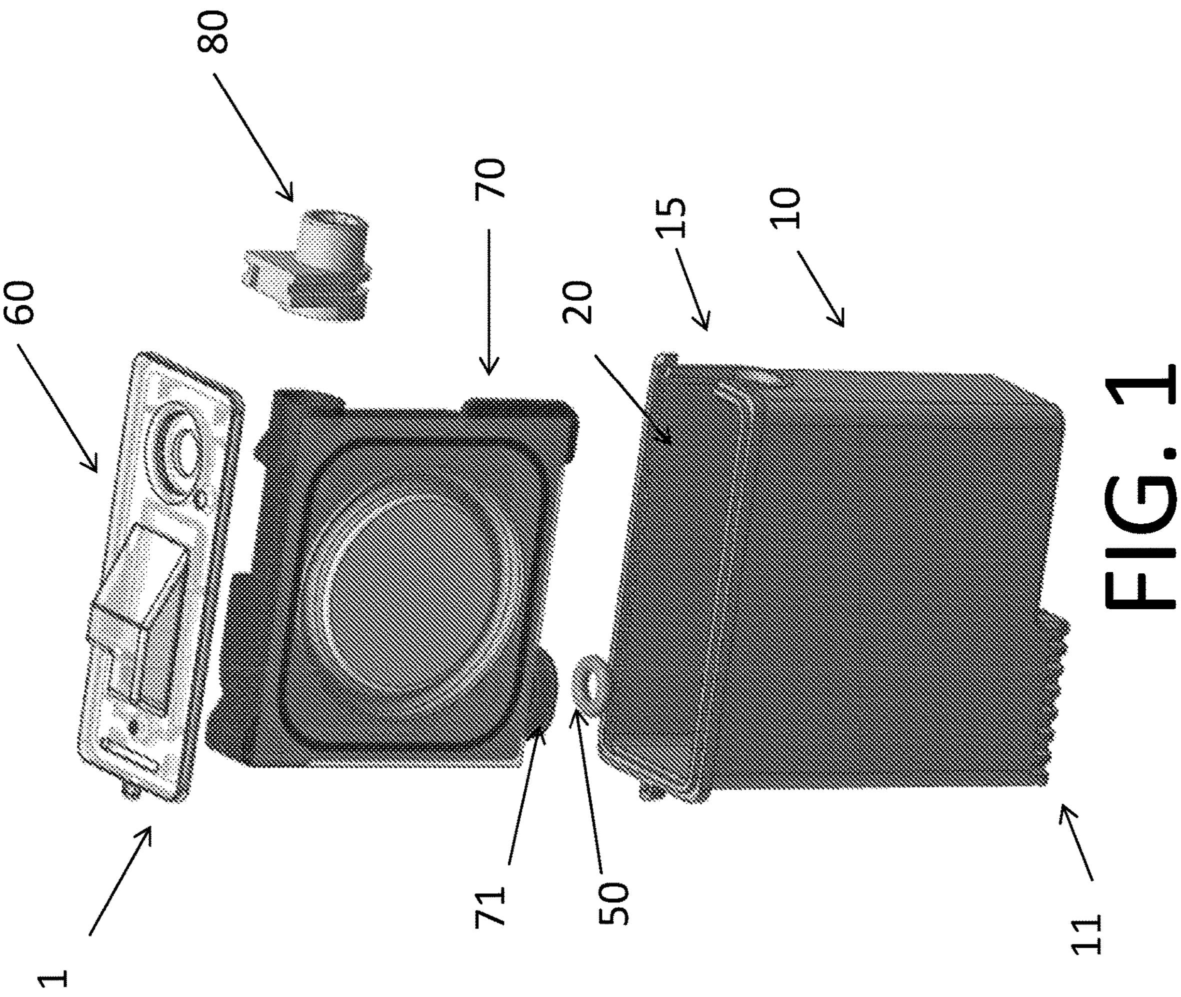
FIG. 1 is an exploded perspective view of a print cartridge assembly according to an exemplary embodiment of the present invention.

In exemplary embodiments of the present invention, a fluid interconnection with a guided mating component is provided that allows a print cartridge to connect to an external fluid delivery system. The fluid interconnection allows for reduced manufacturing complexity and customization.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

Figure 2:
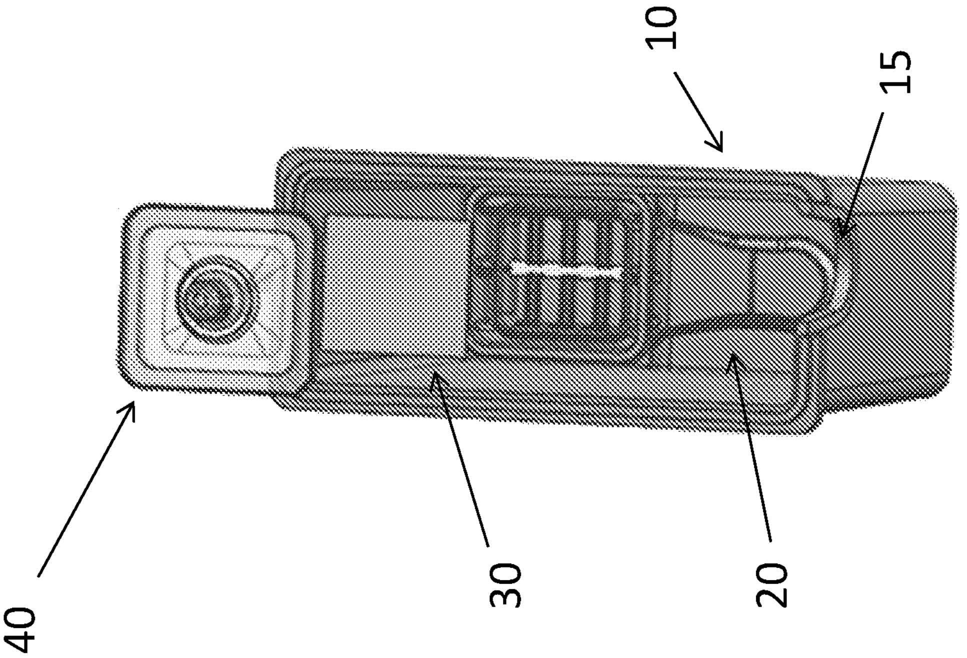
FIG. 2 is a perspective view of the print cartridge assembly of FIG. 1.

Initially referring to FIG. 1 and FIG. 2, a print cartridge according to an exemplary embodiment of the present invention includes a printhead assembly 1, an ink cartridge body 10, a chamber 20, a filter 30, a filter cap 40, a gasket 50, a lid 60, and an ink bladder 70. A mating component 80 and opening 15 are also shown, and are described further herein. Although only one ink bladder 70 is shown in the figures, it should be appreciated that multiple ink bladders 70 and/or other types of reservoirs may be provided to accommodate one or more color inks. Ink bladder 70 is installed in chamber 20 and includes an exit port 71 for delivery of the ink to other portions of the printhead assembly 1. Exit port 71 may include an interface structure, such as a lip or extension for coupling with another portion of the printhead assembly 1, as described further herein.

Attached to the ink cartridge body 10 is a print head chip 11 including a plurality of nozzles for delivery of the ink to a print medium, such as a sheet of paper or other material. In embodiments, the nozzles may be attached to a structure separate from print head chip 11. The ink flows from the exit port 71 of the ink bladder 70 through channels in the lower portion of ink cartridge body 10. The ink then flows within the ink cartridge body 10 to a manifold in the print head chip 11, from which it is drawn to the nozzles for ejection onto the print medium.

Figure 3:
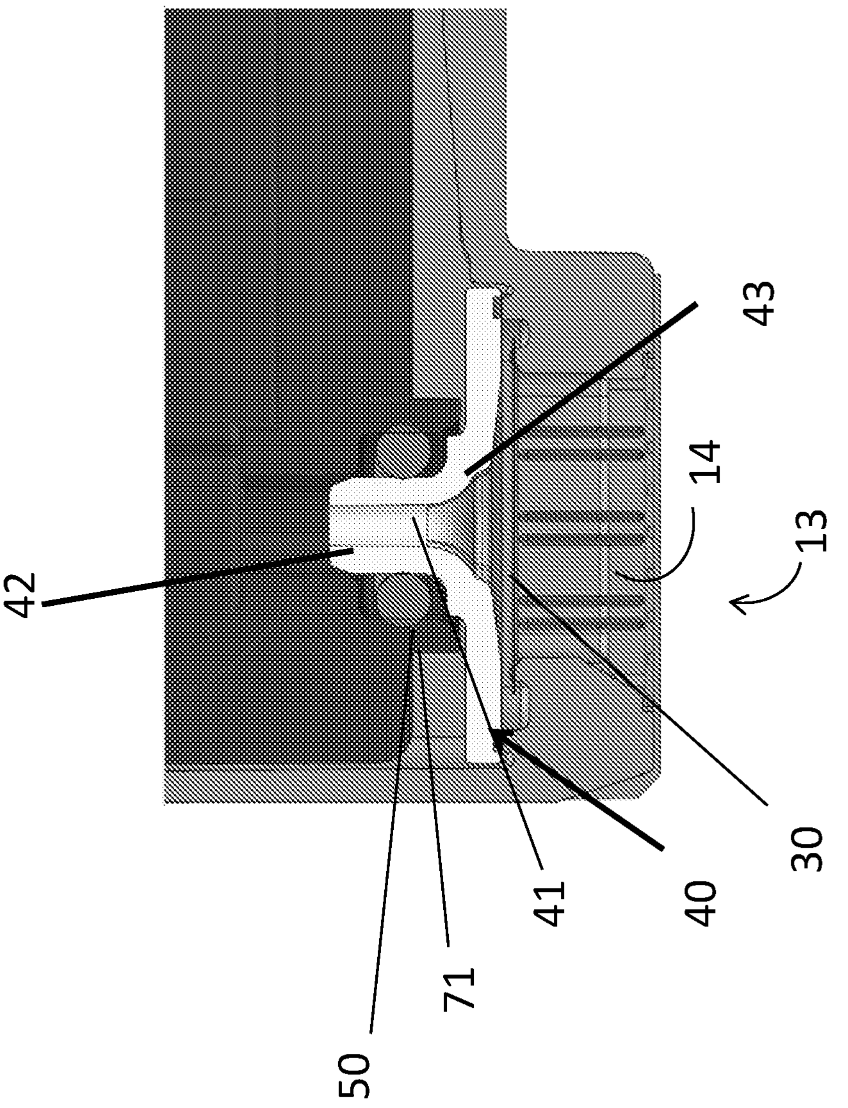
FIG. 3 is a cross-sectional detail view of a portion of the print cartridge assembly of FIG. 1.

Referring now to FIG. 3, the lower portion of the ink cartridge body 10 includes an interior cavity in the form of tower 13. The tower 13 may include any appropriate extension, structure, port, or interface for receiving ink for printing. As shown, tower 13 may include a raised tubular extension, or standpipe, having one or more openings 14 through which ink may flow. Other tower configurations are also possible as will be readily apparent to one of ordinary skill in the art.

Filter cap 40 engages tower 13, and in particular, may be welded or otherwise affixed to an upstanding outer perimeter wall of the tower 13. The filter cap 40 includes a conduit or guide component for providing a passage between ink cartridge body 10 and the ink bladder 70. In the exemplary embodiment shown, the filter cap 40 includes an inner passage 41 for providing ink therethrough, the inner passage 41 having a tapered configuration with a smaller diameter upper passage portion 42 at the at the ink bladder 70 end and a larger diameter lower passage portion 43 near the ink cartridge body 10 end. Filter cap 40 may be made of a polymeric material, for example, a polyamide such as nylon, PET, Noryl. In embodiments, filter cap 40 may be formed of additional or alternative materials that can provide a fluid resistant seal against the tower 13, ink cartridge body 10, and ink bladder 70.

The upper passage portion 42 of filter cap 40 engages a corresponding exit port 71 of the ink bladder 70 to allow ink to flow from the ink bladder 70 to the inner passage 41 of filter cap 40. Gasket 50 is disposed adjacent to the filter cap 40 and assists in sealing between filter cap 40 and ink bladder 70. In this regard, gasket 50 that engages the upper passage portion 42 to create a fluidic seal to control fluid and evaporative losses and prevent air from entering the system such that back pressure can be maintained. Gasket 50 may be made of suitable elastomer material, or other material with good sealing properties. In embodiments, a different or supplemental type of sealing member may be used.

Filter 30 is disposed in tower 13 and filters contaminants in the ink as it approaches printhead chip 11 (FIG. 1). Filter 30 can also provide capillary functions to allow ink to pass upon demand and prevent air passage into printhead chip 11. Filter 30 may be made of a metal weave, a polymer weave, or other mesh, screen, or weave materials. For example, a stainless steel dutch twill or a stainless steel weave material may be used to form filter 30. Filter 30 may be disposed in ink cartridge body 10, or in another example, may be heat staked into ink cartridge body 10.

Referring back to FIGS. 1 and 2, lid 60 may be used to prevent vapor loss through permeation of fluids therethrough. The material used to form lid 70 and associated ink cartridge body 10 may be a nylon material, such as Nylon 6,6, Nylon 6, Nylon 6,12, or another type of polymeric material, such as polyethersulfone, polypropylene, polyethylene, polyoxymethylene. In embodiments, lid 70 may be formed of additional or alternative materials with different properties suitable for preventing vapor losses, for example, materials that are compatible with different ink types. In embodiments, lid 70 may permit a degree vapor loss through permeation. Accordingly, another vapor barrier may be provided by the presence of ink bladder 70. In this regard, ink bladder 70 may be made of a polymeric material, such as polypropylene- or polyethylene-based materials to create a sufficient permeation barrier. In embodiments, ink bladder 70 may be formed of additional or alternative materials. In this regard, ink bladder 70 may provide a primary permeation boundary for ink cartridge body 10. When ink bladder 70 is attached internally to ink cartridge body 10 and lid 60, a tortuous vent path is created having a high length to area ratio, i.e., a vent path is provided having a substantially greater length than its cross-sectional diameter. This tortuous path allows air to move through it, while maintaining a high humidity environment, which reduces evaporative losses and greatly reduces permeation from the system.

Figure 4:
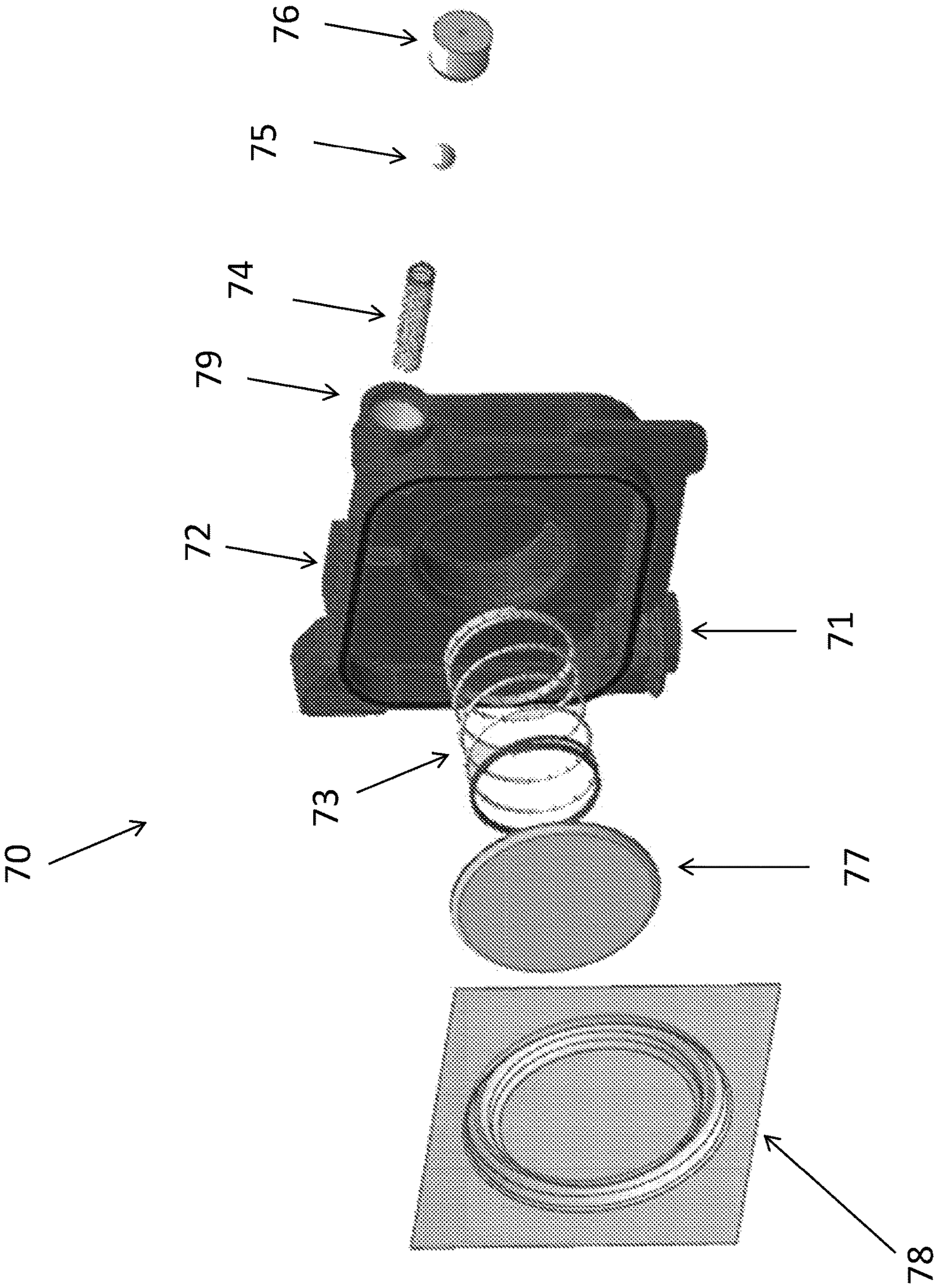
FIG. 4 is an exploded view of an ink bladder for use with the print cartridge assembly of FIG. 1 according to an exemplary embodiment of the present invention.

Referring now to FIG. 4, an exploded view of ink bladder 70 is shown. Ink bladder 70 includes a frame 72, a plate spring 73, a ball spring 74, a fill ball 75, a septum 76, a spring guard 77 and a backplate 78. Frame 72 may be rectangular or square in shape and may be made of any suitable material, for example, polypropylene and/or polyethylene material. Frame 72 provides a hub upon which other fluid connections may be coupled, as described further herein. An ink fill hole 79 is disposed on the side of bladder 70, which is concentric with septum 76 and opening 15 (to be described later) on ink cartridge body 10. Ball spring 74 and fill ball 75 may be disposed within ink fill hole 79 to allow for passage of ink into ink bladder 70 while preventing leakage. Ball spring 74 supplies force against fill ball 75 to create a seal with septum 76. Ball spring 74 can be deflected to unseal fill ball 75 and the surface of septum 76. In embodiments, septum 76 may define a recess within which fill ball 75 is seated.

Plate spring 73 may be made of a metallic material, for example a steel material such as 316 stainless steel. In embodiments, plate spring 73 may be formed of additional or alternative materials. Plate spring 73 delivers force to frame 72 and backplate 78 to generate back pressure, e.g., an at least partial vacuum pressure, which allows the external ink supply to maintain equilibrium with the ink inside of ink bladder 70 and prevent unwanted pressure fluctuations. Plate spring 73 is disposed at one end inside a cavity in frame 72 and at the opposite end on spring guard 77. In this regard, plate spring 73 biases to spring guard 77 to create an internal negative pressure, for example, to keep the printhead from drooling ink during installation. Spring guard 77 pushes on backplate 78 and the inner cavity of frame 72, which act as the rigid surface areas that generates the back pressure in the system. Spring guard 77 helps define internal pressure with the spring force by supplying an area across which force may be distributed and further serves to protect backplate 78 from spring punctures. Backplate 78 may have flexible sidewalls to accommodate and help regulate pressure fluctuations. Backplate 78 and spring guard 77 may be made of any suitable material, for example, a metallic, polymeric, and/or composite material. In the exemplary embodiment shown, ink fill hole 79 and exit port 71 are disposed at 90 degrees from each other. In embodiments, it will be understood that ink fill hole 79 and exit port 71 may have different orientations.

Figure 5:
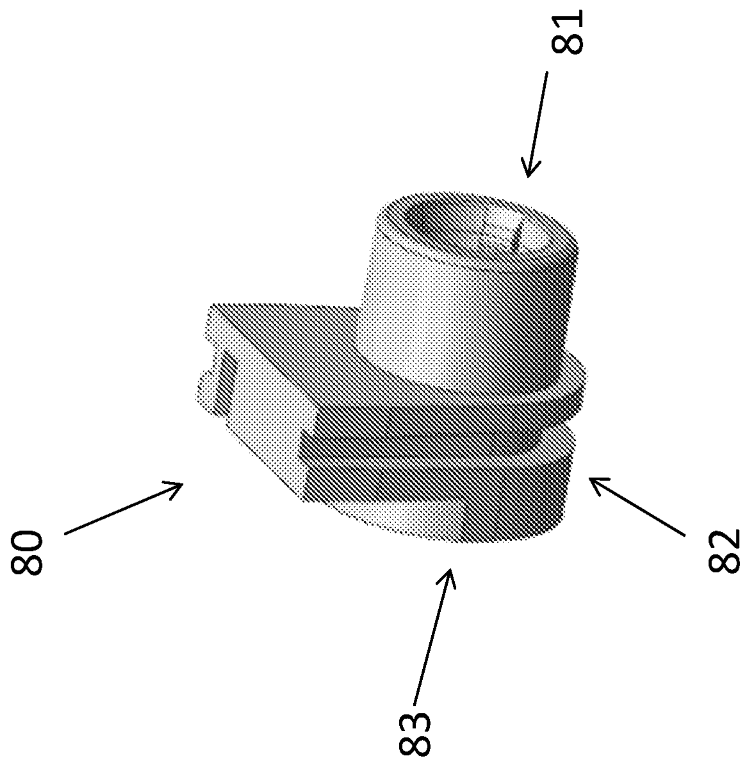
FIG. 5 is a detail view of a mating component for use with the print cartridge assembly of FIG. 1 according to an exemplary embodiment of the present invention.

Turning to FIG. 5, fluid interconnector mating component 80 is shown according to an exemplary embodiment of the present invention. Mating component 80 includes an inlet 81, a groove 82, and an outlet 83. Inlet 81 and outlet 83 may be cylindrical, as shown, or may have a different configuration. Mating component 80 may be made formed of any suitable material, for example, a metallic material such as stainless steel, a composite material, or a polymeric material, such as polyethylene, polypropylene, or any other suitable material. Groove 82 may be defined by two walls that separate inlet 81 and outlet 83. Groove 82 receives and interlocks with opening 15 on ink cartridge body 10 such that the mating component 80 is securely coupled to the ink cartridge body 10. In embodiments, groove 82 may be coupled to ink cartridge body 15 in any suitable manner, for example, press fit, interference fit, snap fit, friction fit, heat or ultrasonic welding, adhesion, or mechanical fastening. Mating component 80 is designed to be added later in the manufacturing process to ensure a manageable manufacturing envelope on the assembly line so as to reduce assembly issues and manufacturing part complexities. Further, adding mating component 80 later in the manufacturing process allows for customization based on specific customer needs. Mating component 80 may be swapped out with other like-mating components for versatility based on the user's specific printing task. For example, a mating component 80 with different inlet 81 and outlet 83 sizes may be desirable for printing with a variety of fluids with different viscosities and different external tube diameters. Mating component 80 may also be interchanged with another mating component if the user desires to throttle the flow of liquid using a smaller inlet 81.

Figure 6:
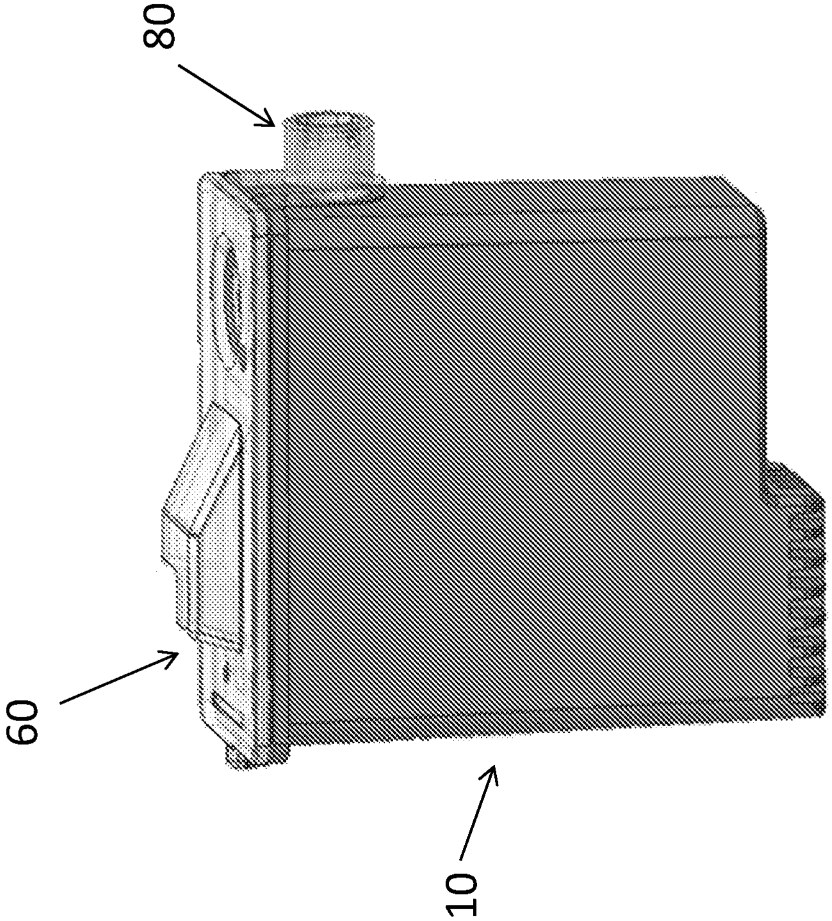
FIG. 6 is perspective view of the mating component of FIG. 5 assembled with the print cartridge assembly of FIG. 1.
Figure 7:
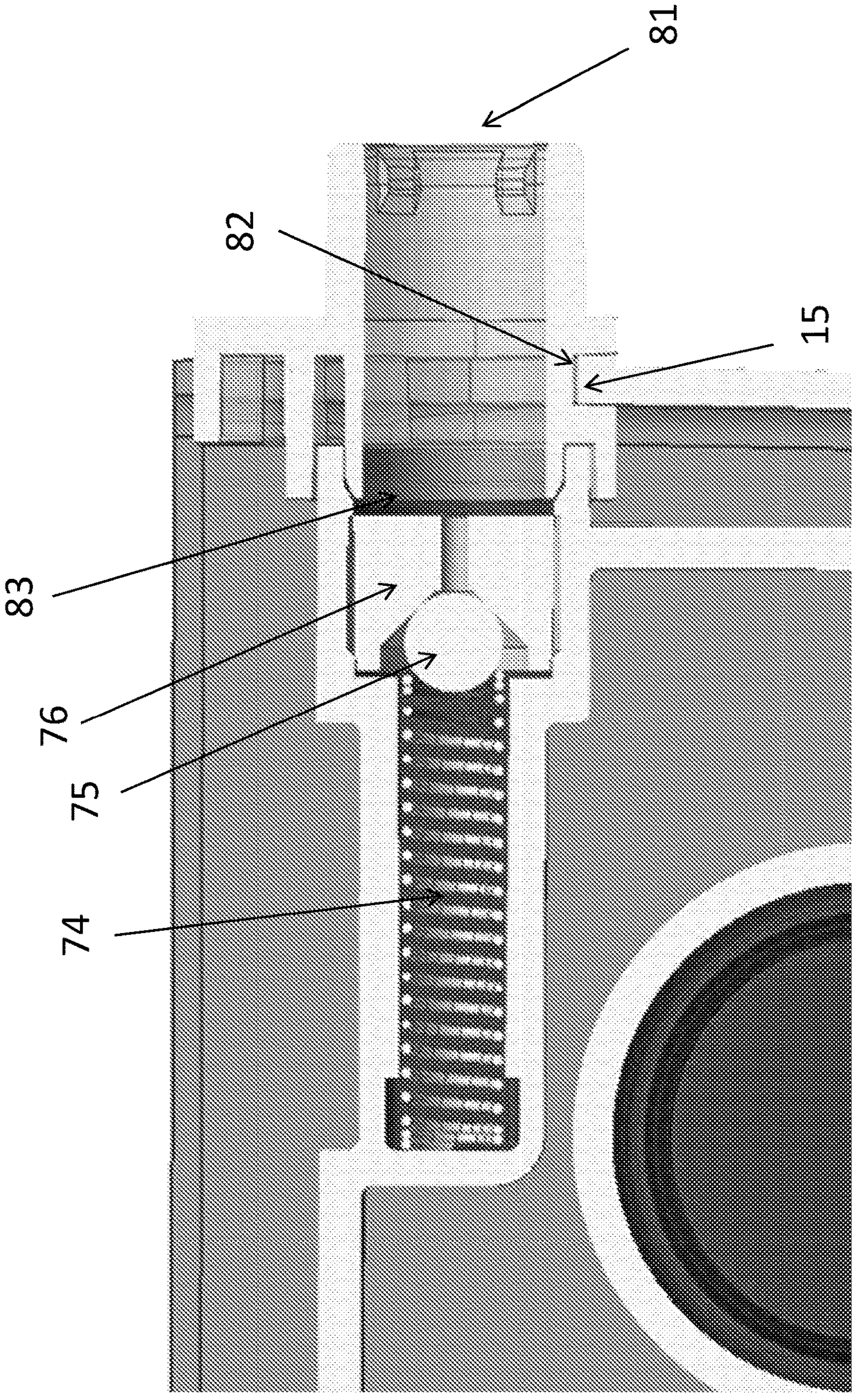
FIG. 7 is a cross-sectional view of the assembly shown in FIG. 6.

Referring to FIG. 6 and FIG. 7, mating component 80 is shown assembled with ink cartridge body 10. When mating component 80 is assembled onto opening 15 on ink cartridge body 10, inlet 81 may be aligned with ink fill hole 79. Inlet 81 may be concentrically aligned with ink fill hole 79, as shown. In embodiments, inlet 81 may be offset from ink fill hole 79.

Figure 8:
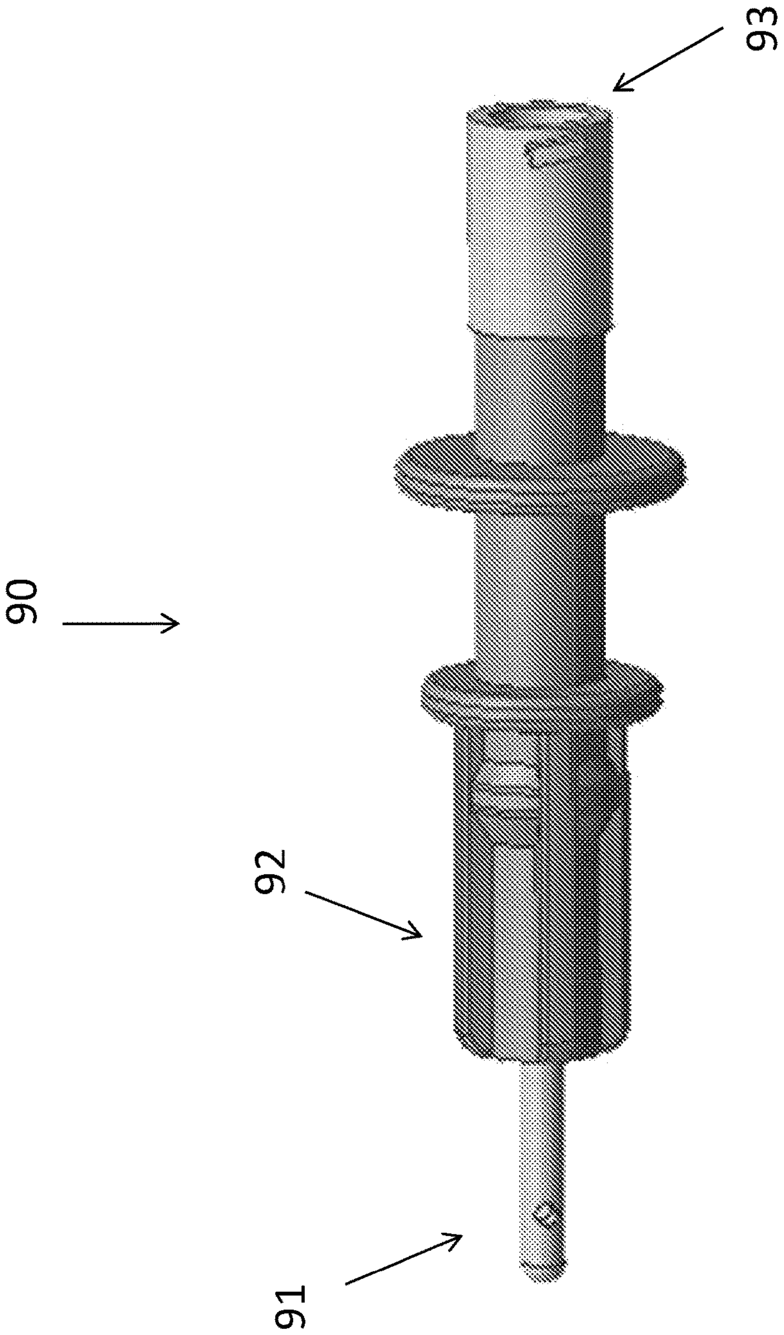
FIG. 8 is a perspective view of a fluid interconnector for use with the print cartridge assembly of FIG. 1 according to an exemplary embodiment of the present invention.

Turning to FIG. 8. an exemplary embodiment of a fluid interconnector 90 is shown, which includes a needle 91, an interlock 92, and an external fluid connector 93. Fluid interconnector 90 is concentrically aligned with inlet 81 and ink fill hole 79 and is designed to ensure proper alignment during external fluid connection. Needle 91 is inserted into septum 76 for proper fluid connection. Septum 76 is flexible and seals against both the frame 72 and the fill ball 75 when the printhead assembly 1 is not connected to an external ink supply. Septum 76 seals against the frame and needle 91 when printhead assembly 1 is connected to an external ink supply.

Figure 9:
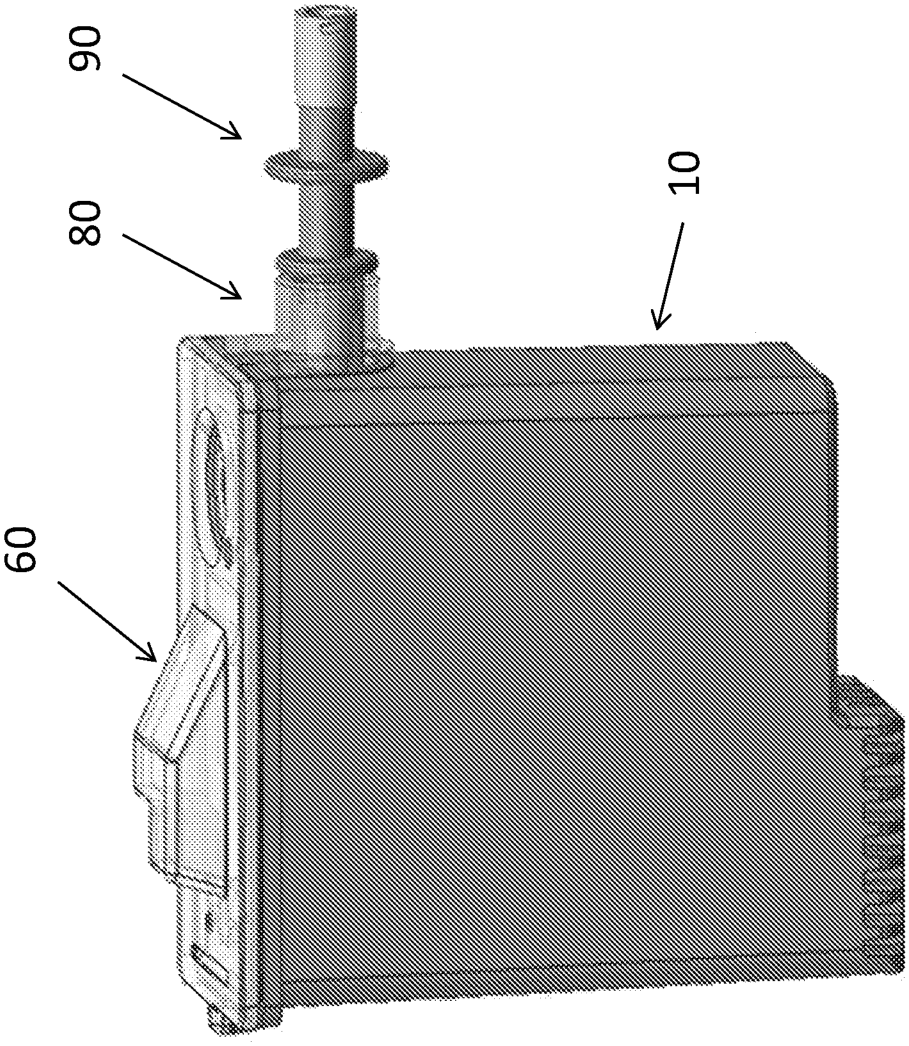
FIG. 9 is a perspective view of the fluid interconnector connected with the mating component of FIG. 6 and the print cartridge assembly of FIG. 1.

Referring to FIG. 9, when fluid interconnector 90 and mating component 80 are fully assembled onto ink cartridge body 10, ink flows initially from the external fluid supply into fluid interconnector 90, in the inlet port 81 of mating component 80. The ink then flows through outlet port 83 and into ink bladder's 70 ink fill hole 79. Ink bladder 70 is designed to maintain pressure equilibrium with the external ink supply so that more ink volume will be brought into ink bladder 70 such that high pressure spikes in the ink delivery system are limited. Interlock 92 is designed to lock into mating component 80. In embodiments, the sleeve of interlock 92 snaps into mating component 80 to ensure a proper fluidic seal. Interlock 92 also allows for easy connect-disconnect options for users and further allows external fluid interconnector 93 something to latch onto for a proper seal.

In embodiments, interlock 92 may also be configured for permanent connection with mating component 80. It should be appreciated that the connection from mating component 80 to fluid interconnector 90 may comprise of a friction fit, snap fit, threaded fit, interference fit, press fit, or any other lock or fit type, or combination thereof that allows for easy connect-disconnect options for the user.

Figure 10:
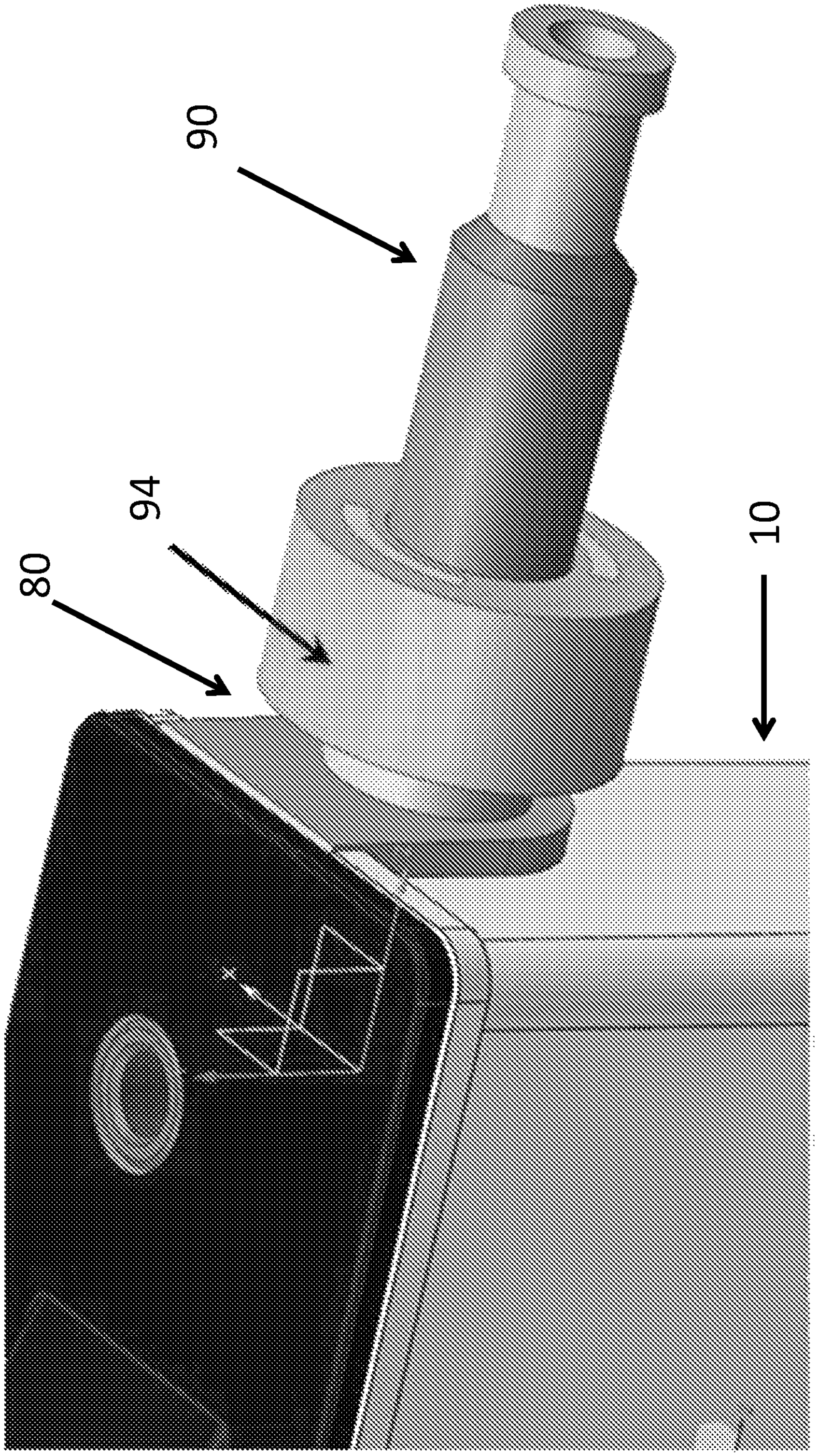
FIG. 10 is a perspective view of an alternative embodiment of the fluid interconnector assembly shown in FIG. 9.
Figure 11:
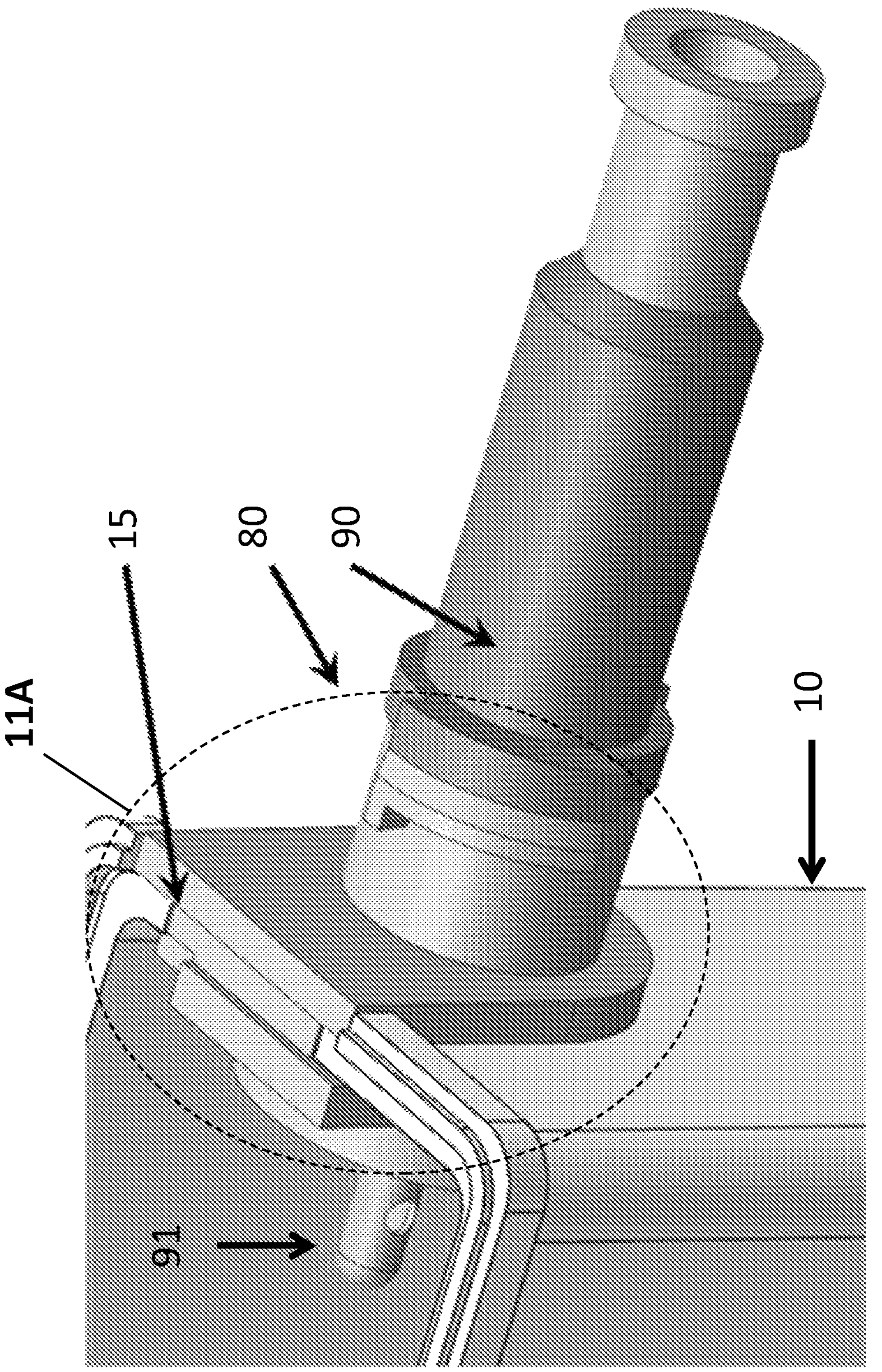
FIG. 11 is a perspective view similar to FIG. 10, with the twisting lock nut removed.

Referring to FIG. 10, a twisting nut lock 94 may be provided with fluid interconnector 90 to reduce spillage during disconnection of mating component 80 from fluid interconnector 90, as extraction forces are minimized during the initial pull. Twisting nut lock 94 may be threadably or otherwise rotatably engaged with the fluid interconnector 90. With additional reference to FIG. 11, nut lock 94 and lid 60 are shown removed so that the assembly can be easily seen.

Figure 11A:
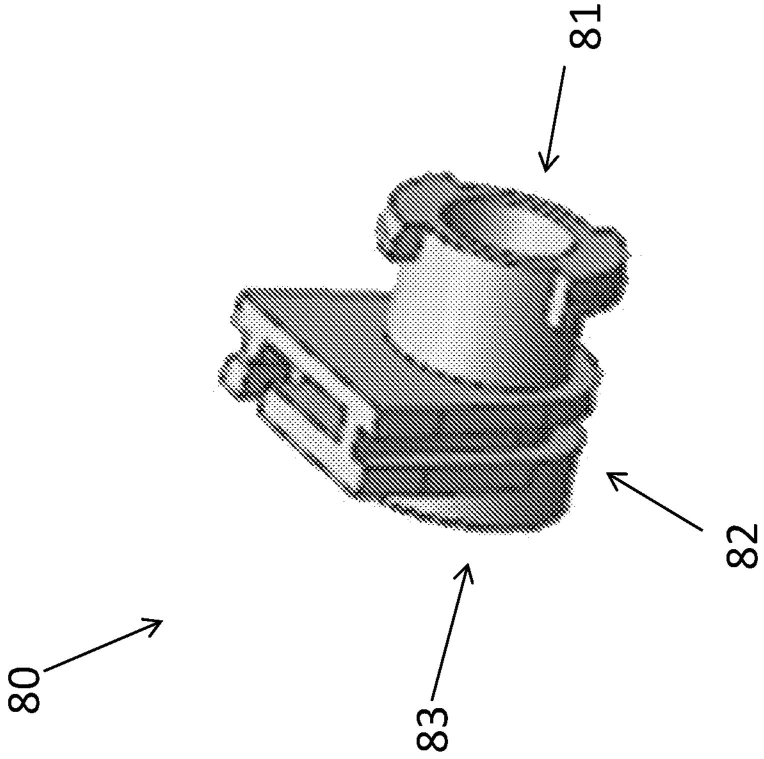
FIG. 11A is a detail view of the area identified in FIG. 11.

Turning to FIG. 11A, a detail view of an exemplary embodiment of the mating component 80 for use with the twisting nut lock 94 is illustrated. As shown, mating component 80 may include external threads 84 for engagement with an interior portion of nut lock 94, for example, one or more interior threaded structures of twisting nut lock 94. In embodiments, twisting nut lock 94 and mating component 80 may interengage in another fashion, for example, a bayonet-type coupling. It will be understood that, in embodiments, other combinations of structures for interengagement may be provided for mating component 80 and twisting nut lock 94.

Figure 12:
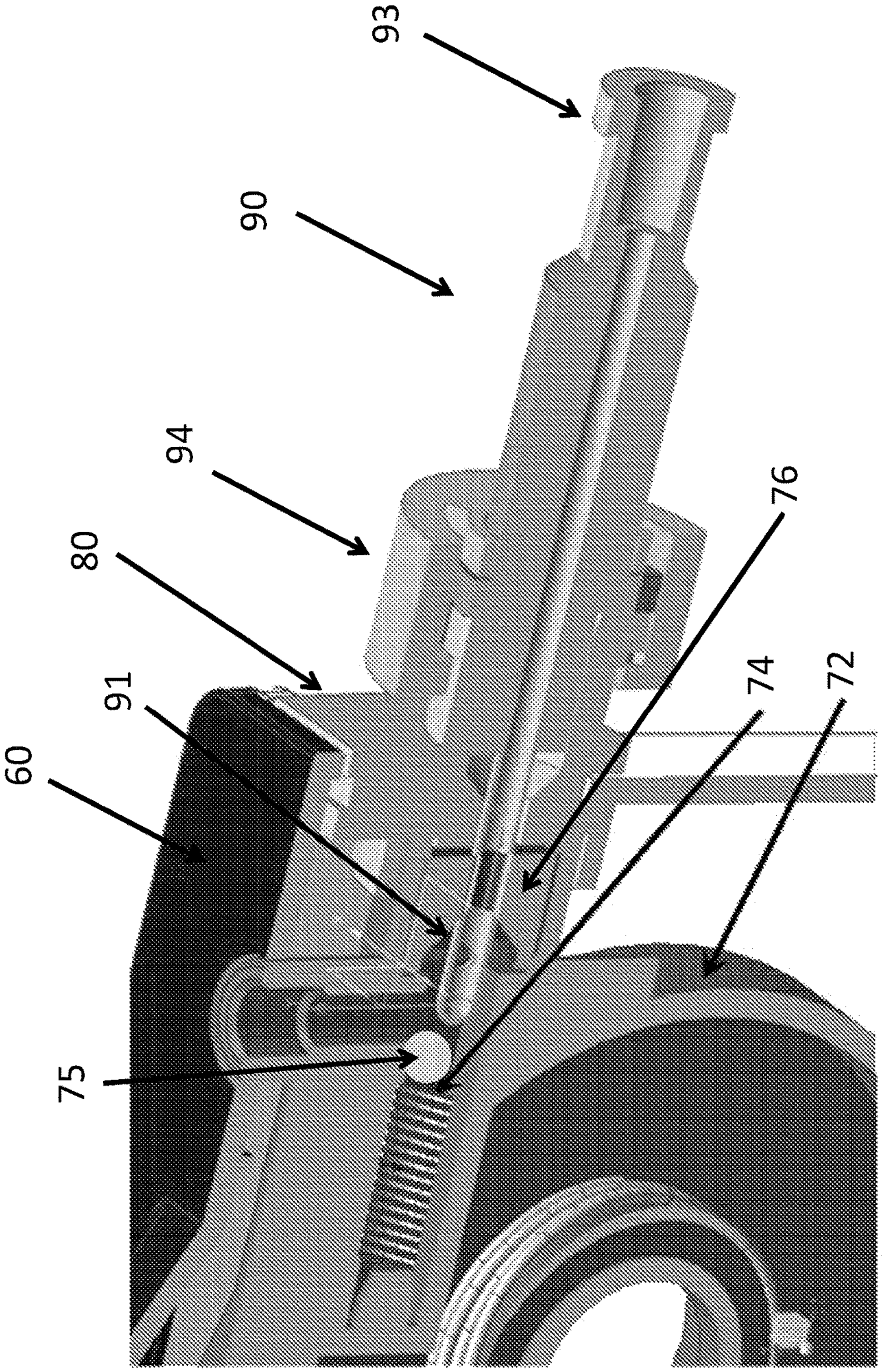
FIG. 12 is a cross sectional view of the embodiment shown in FIG. 10.

With further reference to FIG. 12, a cross-sectional view of the assembled lock nut 94, mating component 80, and fluid interconnector 90. The lock nut 94 of the present embodiment may be used, for example, if relatively quick connection and/or disconnection of the fluid interconnector 90 and printhead assembly 1 is desired. The easy connect-disconnect nature of the adjacent interlocking and removable parts can facilitate diagnosis and correction of blockages, air accumulation, fluid leakages, and/or other obstructions. Further, allowing mating component 80 and fluid interconnector 90 to be interchanged allows a printing system to remain versatile to fit the specific needs of a user. Thus, the user is provided with multiple configurations for use which may be selected on the particular application at hand.

Figure 13:
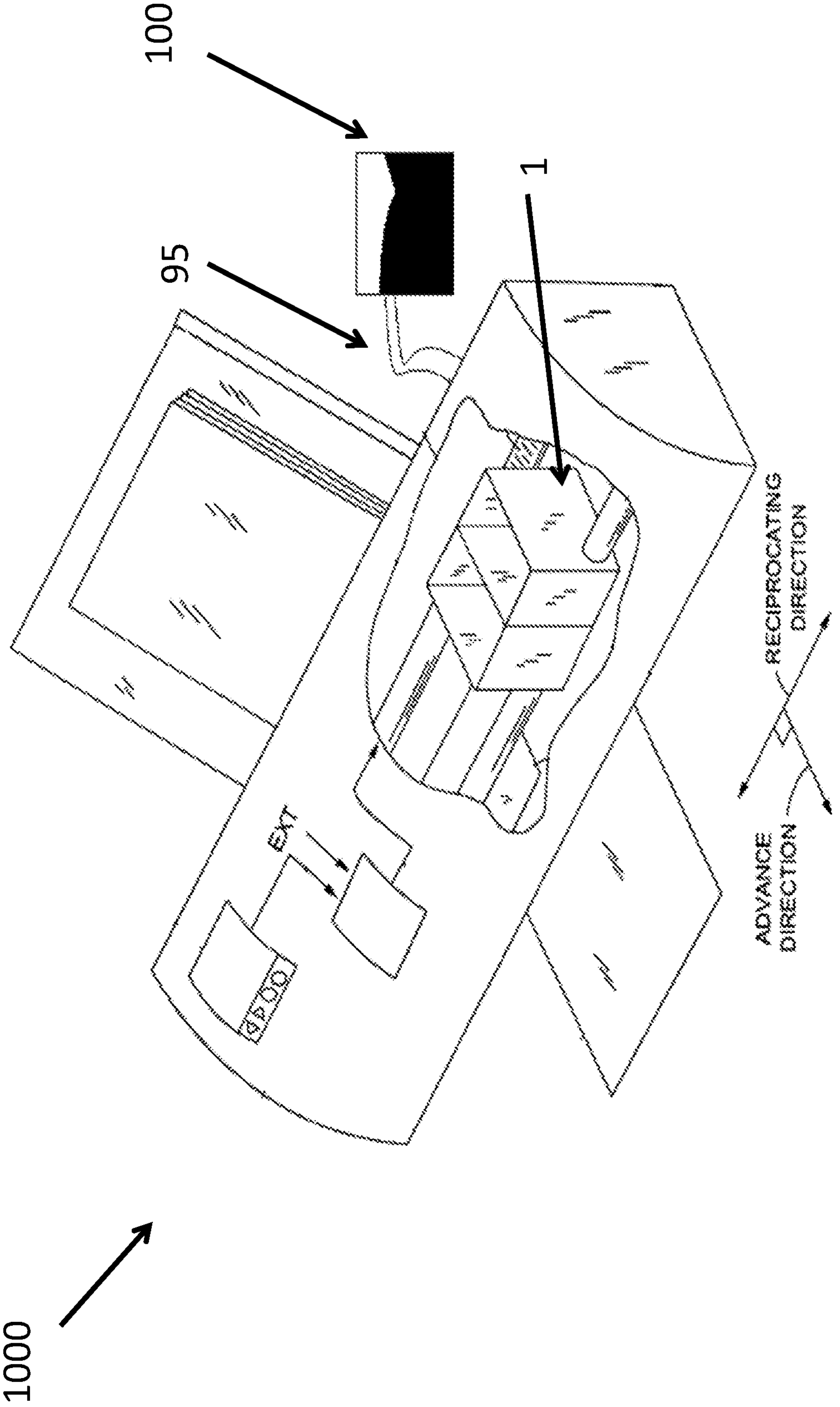
FIG. 13 is a perspective view of an inkjet printing system according to an exemplary embodiment of the present invention.

Referring now to FIG. 13, an exemplary embodiment of a printing system is generally designated 1000. Printhead assembly 1, as shown, is connected to an external ink supply 100 through a tube 95. Tube 95 may be any type suitable for fluid coupling, for example a channel, conduit, or cable configured to transmit fluid therethrough. In embodiments, tube 95 may be, for example, rigid, semi-rigid, or flexible depending on a desired application. For example, tube 95 may be flexible in the case of a printhead disposed on a scanning carriage, or may be partially or fully rigid in the case of a stationary printhead. Tube 95 may be formed of any suitable material for carrying ink, for example, a polymeric material. Ink is carried from external ink supply 100 through tube 95 into printhead assembly 1 as described in accordance with various embodiments herein.

Figure 14:
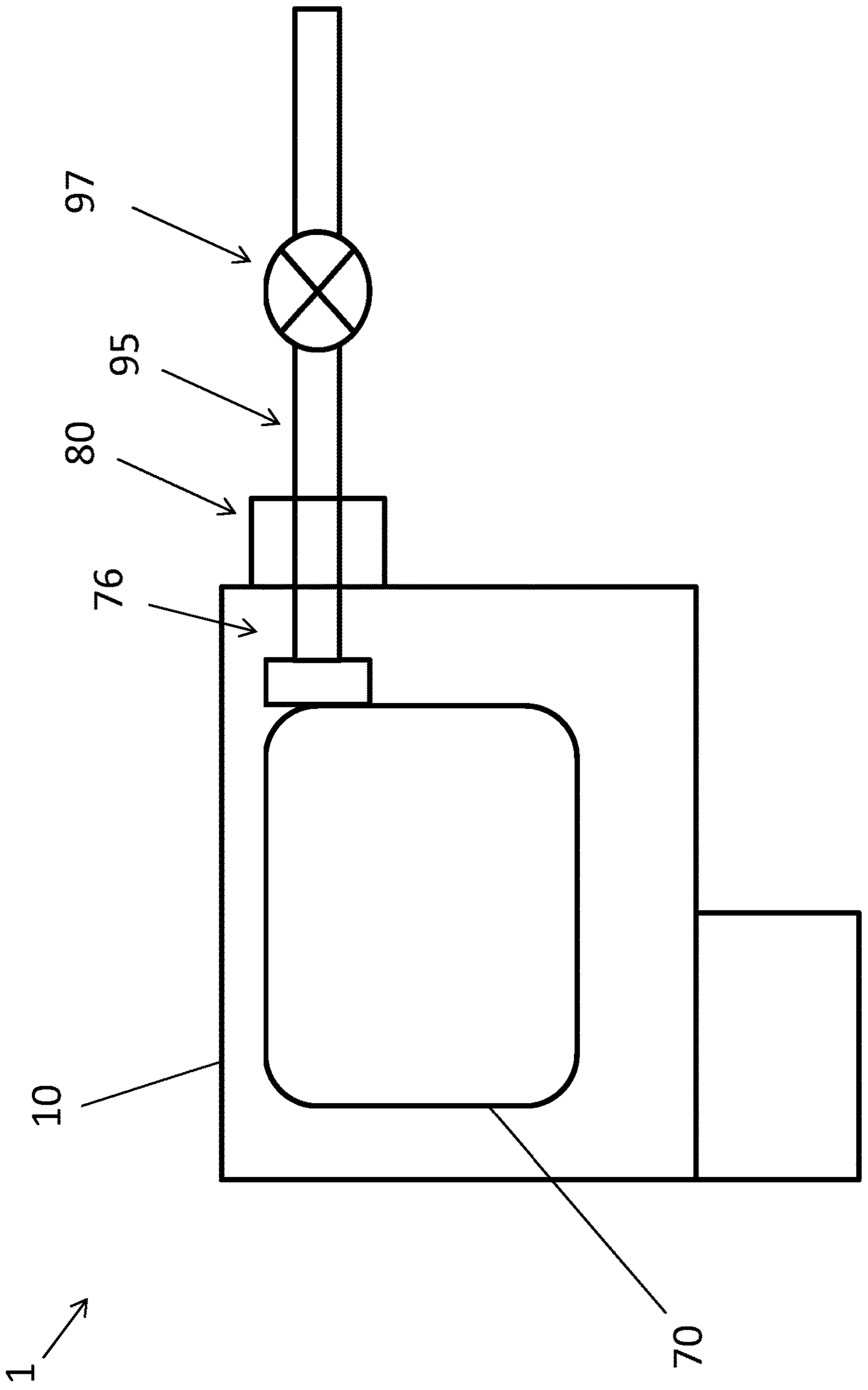
FIG. 14 is a schematic diagram of a print cartridge assembly according to another exemplary embodiment of the present invention.

With reference to FIG. 14, in embodiments, tube 95 is connected directly to septum 76 and extends outwardly from the ink cartridge body 10 through mating component 80. Tube 95 may extend coterminously with the mating component 80, or may extend through mating component 80 and externally from ink cartridge body 10, for example, for connection to another fluid tube coupled with external ink supply 100 (FIG. 13). In embodiments, mating component 80 may protrude externally from ink cartridge body 10, as shown. Accordingly, mating component 80 provides support for the tube 95 extending therethrough, as well as aligning tube 95 carrying ink therethrough for supply to the ink bladder 70. In embodiments, an external retainer may be provided on the mating component 80 and/or ink cartridge body 10 for supporting and/or guiding tube 95.

In embodiments, a valve 97 may be provided along a portion of the tube 95 for controlling the flow of ink therethrough. In embodiments, valve 97 may include an external feature for controlling operation of the valve 97 by the user, such as a lever or switch in the case of a Luer-type lock. Other suitable valve configurations for use with tube 95 will be envisioned in accordance with exemplary embodiments of the present invention. In embodiments, the presence of valve 97 may obviate the need for a separate fill ball 75 and spring 74 for use with a septum 76 (FIG. 4). In embodiments, a fill ball 75 and spring 74 may be provided for use with septum 76 in addition to valve 97 being present.

Figure 15:
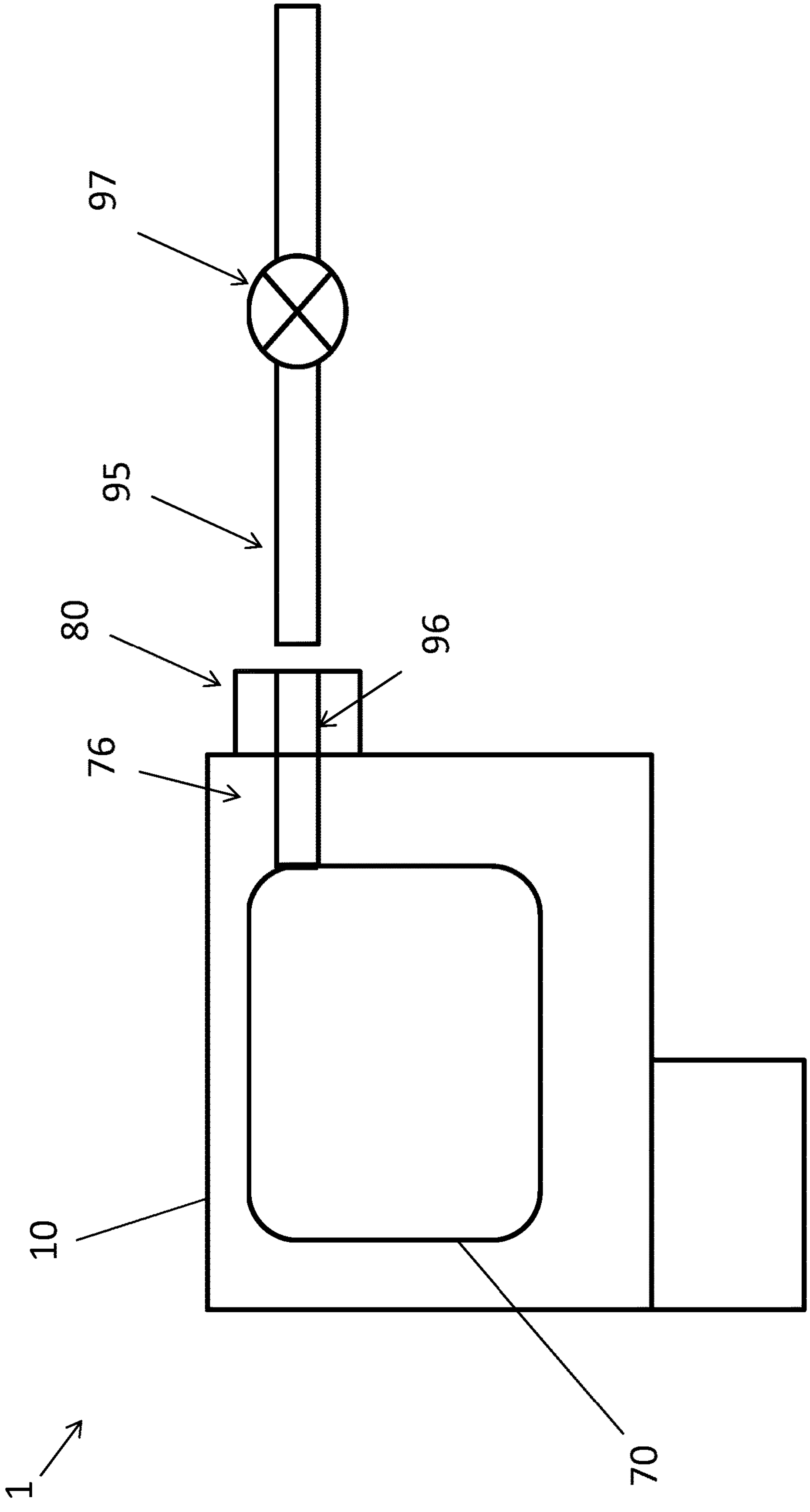
FIG. 15 is a schematic diagram of a print cartridge assembly according to another exemplary embodiment of the present invention.

With reference to FIG. 15, in embodiments, a connecting tube 96 may extend directly from ink bladder 70 and extend within or through mating component 80 in a manner such that the mating component 80 and connecting tube 96 extending therethrough may present a point of attachment for an externally-disposed tube, such as tube 95 that is provided, for example, by a user or by a manufacturer. In this regard, a user may fit tube 95 over the connecting tube 96 to facilitate the flow of ink into ink bladder 70. In embodiments, tube 95 may be sized to fit over the connecting tube 96 either within the inlet port 81 of mating component 80, or may be sized to fit over the inlet port 81 of mating component 80. In this regard, a printhead assembly 1 may be customized for use with different inkjet printing systems or components thereof, for example, by providing a differently-sized connecting tube 96 and/or by providing one or more adapter members for coupling differently-sized tubes 95 with connecting tube 96 and/or mating component 80.

Still referring to FIG. 15, because connecting tube 96 is directly coupled with ink bladder 70, e.g., connecting tube 96 may be integrally formed with ink bladder 70, the need for septum 76 (FIG. 14) to provide a seal between connecting tube 96 and ink bladder 70 may be obviated. In embodiments, septum 76 may be provided for use with connecting tube 96 at any point along connecting tube 96 or tube 95.

In embodiments, mating component 80 may be directly connected to ink bladder 70 without the presence of a connector tube such that the mating component 80 presents the point of fluidic connection between the ink bladder 70 and an external ink supply 100. As described above, a valve 97 may be provided to control the flow of fluid through tube 96.

Now that embodiments of the present invention have been shown and described in detail, various modifications and improvements thereon will become readily apparent to those skilled in the art. Accordingly, the exemplary embodiments of the invention, as set forth above, are intended to be illustrative, not limiting. The spirit and scope of the present invention is to be construed broadly.

What is claimed is:

1. A printing system comprising:
a print cartridge, comprising:
a main body;
a bladder disposed within the main body and comprising a fluid fill hole; and
a fluid interconnect assembly, comprising:
a mating component directly connected to the main body and comprising an inner channel; and
a fluid interconnector releasably supported by the mating component at an exterior portion of the main body, the fluid interconnector comprising:
a distal end portion comprising a tube configured to receive fluid from an external fluid supply for transfer of fluid to the bladder;
a proximal end portion comprising a needle aligned with the fluid fill hole of the bladder and that delivers fluid directly into the bladder from the tube through the inner channel of the mating component; and
an intermediate portion disposed between the distal end portion and the proximal end portion, the intermediate portion being directly attached to the mating component.

2. The printing system of claim 1, wherein the intermediate portion releasably locks with the mating component.

3. The printing system of claim 1, wherein the intermediate portion forms a unitary structure with the mating component.

4. The printing system of claim 2, wherein the intermediate portion comprises a threaded nut that is rotatably engaged with the mating component for connection and disconnection with the mating component.

5. The printing system of claim 1, further comprising a septum disposed within the fluid fill hole of the bladder.

6. The printing system of claim 5, wherein the needle extends through the septum.

7. The printing system of claim 1, wherein the mating component and the main body form a unitary structure.

8. The printing system of claim 1, wherein the mating component is releasably connected to the main body.

9. The printing system of claim 1, wherein the bladder further comprises a frame member, and the frame member comprises a cavity, a flexible sidewall, and a spring member disposed between the frame member cavity and the flexible sidewall, the spring member engaged with the frame member cavity and the sidewall to bias the flexible sidewall away from the frame member to cause a vacuum pressure to form within the bladder.

10. The printing system of claim 1, wherein the bladder further comprises a ball and a ball spring within the fluid fill hole.

11. The printing system of claim 1, wherein the tube comprises a valve that regulates flow of the fluid into the bladder.

12. The printing system of claim 2, wherein the intermediate portion releasably locks with the mating component by at least one of friction fit, snap fit, threaded fit, interference fit, press fit or combinations thereof.

* * * * *